(12) United States Patent
Park et al.

(10) Patent No.: US 10,284,364 B2
(45) Date of Patent: May 7, 2019

(54) RADIO FREQUENCY PROCESSING DEVICE AND METHOD

(71) Applicant: Samsung Electronics Co., Ltd., Suwon-si (KR)

(72) Inventors: Jun-Young Park, Seoul (KR); Ju-Ho Son, Seoul (KR); Dae-Young Lee, Seongnam-si (KR); Jeong-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/510,647

(22) PCT Filed: Sep. 14, 2015

(86) PCT No.: PCT/KR2015/009603
§ 371 (c)(1),
(2) Date: Mar. 10, 2017

(87) PCT Pub. No.: WO2016/039592
PCT Pub. Date: Mar. 17, 2016

(65) Prior Publication Data
US 2017/0214519 A1    Jul. 27, 2017

(30) Foreign Application Priority Data
Sep. 12, 2014   (KR) .................. 10-2014-0120994

(51) Int. Cl.
*H04L 7/04*         (2006.01)
*H04L 25/02*        (2006.01)
(Continued)

(52) U.S. Cl.
CPC ........... *H04L 7/042* (2013.01); *H04B 1/3888* (2013.01); *H04B 1/50* (2013.01); *H04B 7/0413* (2013.01);
(Continued)

(58) Field of Classification Search
CPC . H04L 7/042; H04L 7/06; H04L 25/02; H04L 7/027; H04B 7/0413; H04W 56/001
(Continued)

(56) References Cited

U.S. PATENT DOCUMENTS 5,724,166 A * 3/1998 Nakata ................ H04J 14/0227
370/242
6,032,057 A * 2/2000 Kiiski ................ H04B 7/15535
455/446
(Continued)

FOREIGN PATENT DOCUMENTS

EP      1528738 A2    5/2005
EP      2573951 A1    3/2013
(Continued)

OTHER PUBLICATIONS

Communication dated Aug. 25, 2017 in connection with European Patent Application No. 15 840 772.6.

*Primary Examiner* — Michael R Neff

(57) ABSTRACT

The present invention relates to a fifth generation (5G) or pre-5G communication system to be provided to support a data transmission rate higher than that of a fourth generation (4G) communication system, such as long term evolution (LTE), and subsequent communication systems. The radio frequency (RF) processing device of the present invention comprises: at least one antenna; an RF unit for performing communication with a base station by using the at least one antenna; a signal filter unit for dividing and outputting, when a signal is received from another RF processing device connected through one interface, a radio signal and a control signal for communicating with the base station from the received signal; a clock signal detection unit for detecting a clock signal from the control signal when the control signal is output from the signal filter unit; and a control unit for
(Continued)

performing an operation according to the control signal according to the clock signal-based timing.

20 Claims, 14 Drawing Sheets

(51) Int. Cl.
| | |
|---|---|
| *H04B 7/0413* | (2017.01) |
| *H04L 7/06* | (2006.01) |
| *H04W 56/00* | (2009.01) |
| *H04B 1/3888* | (2015.01) |
| *H04B 1/50* | (2006.01) |
| *H04J 3/06* | (2006.01) |

(52) U.S. Cl.
CPC ............... *H04L 7/06* (2013.01); *H04L 25/02* (2013.01); *H04W 56/001* (2013.01); *H04W 56/005* (2013.01); *H04W 56/0015* (2013.01); *H04J 3/0685* (2013.01)

(58) Field of Classification Search
USPC .......................................................... 375/267
See application file for complete search history.

(56) References Cited

U.S. PATENT DOCUMENTS

| | | |
|---|---|---|
| 8,670,322 B2 | 3/2014 | Yehezkely et al. |
| 2010/0085988 A1 | 4/2010 | Fukuda |
| 2011/0299630 A1 | 12/2011 | Petrovic |
| 2012/0106674 A1 | 5/2012 | Lee |
| 2012/0169686 A1 | 7/2012 | Kim et al. |
| 2012/0309325 A1 | 12/2012 | Carbone et al. |

FOREIGN PATENT DOCUMENTS

| | | |
|---|---|---|
| KR | 10-2000-0001337 A | 1/2000 |
| KR | 10-2012-0046512 A | 5/2012 |
| KR | 10-2012-0078957 A | 7/2012 |
| KR | 10-2013-0034723 A | 4/2013 |
| KR | 10-2013-0111934 A | 10/2013 |

\* cited by examiner

POWER ON: LESS THAN AVERAGE VALUE

POWER OFF : VDD

RADIO FREQUENCY PROCESSING DEVICE AND METHOD

CROSS-REFERENCE TO RELATED APPLICATION(S)

The present application claims priority under 35 U.S.C. § 365 to International Patent Application No. PCT/KR2015/009603 filed Sep. 14, 2015, entitled "RADIO FREQUENCY PROCESSING DEVICE AND METHOD", and, through International Patent Application No. PCT/KR2015/009603, to Korean Patent Application No. 10-2014-0120994 filed Sep. 12, 2014 each of which are incorporated herein by reference into the present disclosure as if fully set forth herein.

TECHNICAL FIELD

The present disclosure relates to a radio frequency processing apparatus and method.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

A terminal capable of a wireless communication may be configured with a plurality of components, and a function of the terminal may be variously classified. An image signal and a voice signal may be transmitted from the terminal to a base station or transmitted from the base station to the terminal through an air medium. So, there is a need for a process of modulate a signal to a frequency band which the terminal (or the base station) may use to transmit the modulated signal through an air medium and a process of demodulating a frequency band of an original signal after receiving the modulated signal in the terminal (or the base station).

Meanwhile, within one cell, one base station may communication with a plurality of terminals at the same time. For this, all terminals and a corresponding base station which join a communication need to be accurately synchronized. And, each terminal needs to maintain a signal to noise radio (SNR) as a maximum value by continuously controlling an operation criterion, a parameter, and the like of component elements on a signal path with low power on a given channel environment.

Meanwhile, a component for performing a wireless communication included in one terminal may include a component (hereinafter, will be referred to as "RFA") which is connected to an antenna and process a high frequency signal and a component (hereinafter, will be referred to as "RFB") of modulating a high frequency signal to a low frequency signal, and processing an intermediate frequency signal which is acquired by demodulating the low frequency signal corresponding to a preset demodulation scheme.

Various signals may be transmitted and received between the RFA and the RFB, paths (channels) through which corresponding signals are transmitted are different one another according to a signal type. For example, a uplink (UL) signal/downlink (DL) signal, a control signal, and a clock signal may be transmitted and received through different paths. So, the number of cables for a connection between the RFA and the RFB may be two or more according to the number of signal types of signals transmitted and received.

Meanwhile, a plurality of RFAs may be included in a terminal for using a MEMO technology. If the number of RFAs included in the terminal is increased, the number of cables connected to an RFB is also increased, so limitation on configuration and deployment for inner components of the terminal may occur.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes a radio frequency (RF) processing apparatus and method.

An embodiment of the present disclosure proposes an RF processing apparatus and method such that an RFA and an RFB may be connected using one cable.

An embodiment of the present disclosure proposes an RF processing apparatus and method such that a UL/DL signal and a control signal may be identified with a simple method even though the UL/DL signal and the control signal are transmitted through one cable at the same time.

An embodiment of the present disclosure proposes an RF processing apparatus and method such that a clock signal may be detected from a control signal in an RFA by transmitting the control signal with a line coding method even though the clock signal is not transmitted.

An embodiment of the present disclosure proposes an RF processing apparatus and method such that power consumption may be decreased in a case of a configuration in which an RFA and an RFB are connected using one cable.

In accordance with an aspect of the present disclosure, a radio frequency (RF) processing apparatus is provided. The RF processing apparatus includes at least one antenna; an RF unit to perform a communication with a base station using the at least one antenna; a signal filter unit to identify and output a wireless signal for a communication with the base station and a control signal from a signal if the signal is received from other RF processing apparatus connected through one interface; a clock signal detector to detect a clock signal from the control signal if the control signal is output from the signal filter unit; and a controller to perform an operation according the control signal according to timing which is based on the clock signal.

In accordance with another aspect of the present disclosure, a radio frequency (RF) processing apparatus is provided. The RF processing apparatus includes a clock signal generator to generate a clock signal for acquiring synchronization with other RF processing apparatus connected through one interface; a baseband unit to generate a control signal and a wireless signal for a communication with a base station, and to embed the clock signal into the control signal; and a signal filter unit to transmit the control signal into which the clock signal is embedded and the wireless signal to the other RF processing apparatus through the interface.

In accordance with another aspect of the present disclosure, an operation method of a radio frequency (RF) processing apparatus is provided. The operation method includes receiving a signal from other RF processing apparatus connected through one interface; identifying a wireless signal for a communication with a base station from the received signal and a control signal; detecting a clock signal from the control signal if the control signal is identified; and performing an operation according the control signal according to timing which is based on the clock signal.

In accordance with another aspect of the present disclosure, an operating method of a radio frequency (RF) processing apparatus is provided. The operating method includes generating a clock signal for synchronizing with other RF processing apparatus connected through one interface; generating a control signal and a wireless signal for a communication with a base station, and embedding the clock signal into the control signal; and transmitting the control signal into which the clock signal is embedded and the wireless signal to the other RF processing apparatus through the interface.

In an embodiment of the present disclosure, an RFA and an RFB are connected using one cable, so it is possible to transmit a UL/DL signal and a control signal at the same time.

In an embodiment of the present disclosure, an RFB transmits the control signal through a line coding method instead of modulating the control signal, so an RFA may detect a clock signal from the control signal.

In an embodiment of the present disclosure, even though the UL/DL signal and the control signal are transmitted at the same time, it is possible to effectively identify the /DL signal and the control signal using a filter which is simply implemented.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
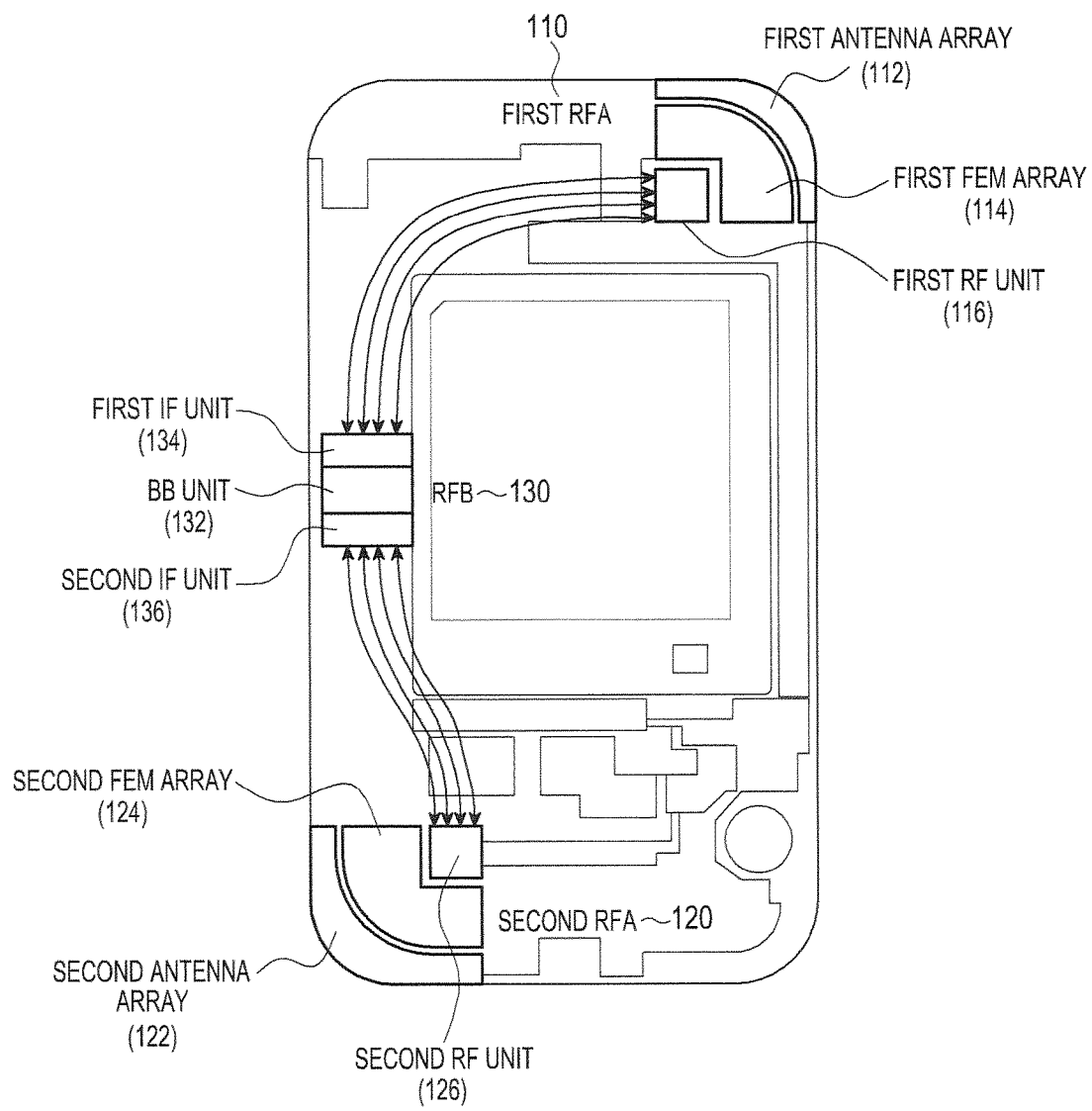
FIG. 1 schematically illustrates an inner structure of a wireless communication unit of a general terminal.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™ Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes a radio frequency (RF) processing apparatus and method.

An embodiment of the present disclosure proposes an RF processing apparatus and method such that an RFA and an RFB may be connected using one cable.

An embodiment of the present disclosure proposes an RF processing apparatus and method such that a UL/DL signal and a control signal may be identified with a simple method even though the UL/DL signal and the control signal are transmitted through one cable at the same time.

An embodiment of the present disclosure proposes an RF processing apparatus and method such that a clock signal may be detected from a control signal in an RFA by transmitting the control signal with a line coding method even though the clock signal is not transmitted.

An embodiment of the present disclosure proposes an RF processing apparatus and method such that power consumption may be decreased in a case of a configuration in which an RFA and an RFB are connected using one cable.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16ad communication system, an IEEE 802.16m communication system, an IEEE 802.16e communication system, an evolved packet system (EPS), a mobile internet protocol (Mobile IP) system, and/or the like.

According to various embodiments of the present disclosure, for example, a terminal may be an electronic device.

A wireless communication unit of a general terminal will be described before describing an embodiment of the present disclosure.

An inner structure of a wireless communication unit of a general terminal will be described with reference to FIG. 1.

FIG. 1 schematically illustrates an inner structure of a wireless communication unit of a general terminal.

Referring to FIG. 1, the wireless communication unit of the terminal includes a component (hereinafter, will be referred to as "RFA") of performing signal transmission and reception through an antenna and processing a high frequency signal and a component (hereinafter, will be referred to as "RFB") of modulating a high frequency signal to a low frequency signal and processing an intermediate frequency signal which is acquired by demodulating the low frequency signal corresponding to a preset demodulation scheme.

The terminal may include a plurality of RFAs to use a multi-input multi-output (MIMO) technology. In FIG. 1, the terminal includes, for example, two RFAs (i.e., the first RFA 110 and the second RFA 120). The first RFA 110 and the second RFA 120 need to be located far from each other by a distance longer than or equal to a predetermined distance. So, as shown in FIG. 1, the first RFA 110 and the second RFA 120 are located at a left-top corner and a right-bottom corner, so the first RFA 110 and the second RFA 120 may be finally located on a diagonal of the terminal The first RFA 110 and the second RFA 120 are components for a high-frequency communication and enable signal transmission and reception through an antenna. The first RFA 110 includes the first antenna 112 operating as an interface with an air medium, the first front end module (FEM) 114 to receive a signal from the first antenna 112 and transfer a signal to the first antenna 112, and the first radio frequency (RF) unit 116 for an interface with an RFB 130.

The second RFA 120 includes the second antenna 122 operating as an interface with an air medium, the second FEM 124 to receive a signal from the second antenna 122 and transfer a signal to the second antenna 122, and the second RF unit 126 for an interface with the RFB 130.

Each of the first antenna 112 and the second antenna 122 may be configured as an array form. In this case, the first FEM 114 and the second FEM 124 also may be configured as an array form which correspond to each antenna one to one.

If the first and second FEMs 114 and 124 and the first and second RF units 116 and 126 use the same process, the first and second FEMs 114 and 124 and the first and second RF units 116 and 126 may be implemented with one component. However, the first and second FEMs 114 and 124 to process a large power signal are generally implemented using a process of a compound such as a gallium arsenide (GaAs), and the first and second RF units 116 and 126 to process a signal with relatively small power may be implemented using a complementary metal-oxide semiconductor (CMOS) process.

The RFB 130 includes a baseband (BB) unit 132, and the first intermediate frequency (IF) unit 134 and the second IF unit 136 which are connected to the first RFA 110 and the second RFA 120. The BB unit 132 generates a digital signal to transfer the generated digital signal to the first IF unit 134 and the second IF unit 136. Each of the first IF unit 134 and the second IF unit 136 converts a received digital signal into an analog signal to modulate the analog signal for easy propagation through an air medium. The first IF unit 134 and the second IF unit 136 transfer the modulated signal to the first RFA 110 and the second RFA 120, respectively.

Meanwhile, even though the number of RFAs included in the terminal is increased, time synchronization may be maintained among the first RFA 110, the second RFA 120, and the RFB 130 if only the RFB 130 is used. An ideal location of the RFB 130 is a center between the first RFA 110 and the second RFA 120. In this case, when delay of a signal occurred in a cable is considered, it may be predicated that data launched in the RFB 130 is reached at the first RFA 110 and the second RFA 120 at the same time.

A wireless communication system which has been recently developed targets implementation of a data rate of 1 Gbps or more on a band which is higher or equal to 28 GHz, and which is significantly higher compared to a current wireless communication system which generally uses a low frequency band less than 5 GHz. For example, loss of a signal occurred in an air medium becomes significantly large on a 28 GHz referred to as mmWave, so a smooth communication environment may be implemented only if this loss is compensated.

If an antenna is used as an array form, the more gain can be acquired compared to a case that one antenna is used. However, if the number of antennas is large, a phenomenon that a signal radiated through an antenna is concentrated on a partial direction may be occurred. A beamforming technology denotes a technology of enabling a signal radiated through an antenna to be concentrated on a desired direction. For using the beamforming technology, phases of signals transferred to each antenna are adjusted, and a component performing this phase adjusting function may be referred to as phase shifter.

Next, signals transmitted and received between a general RFA and RFB will be described with reference to FIG. 2.

Figure 2:
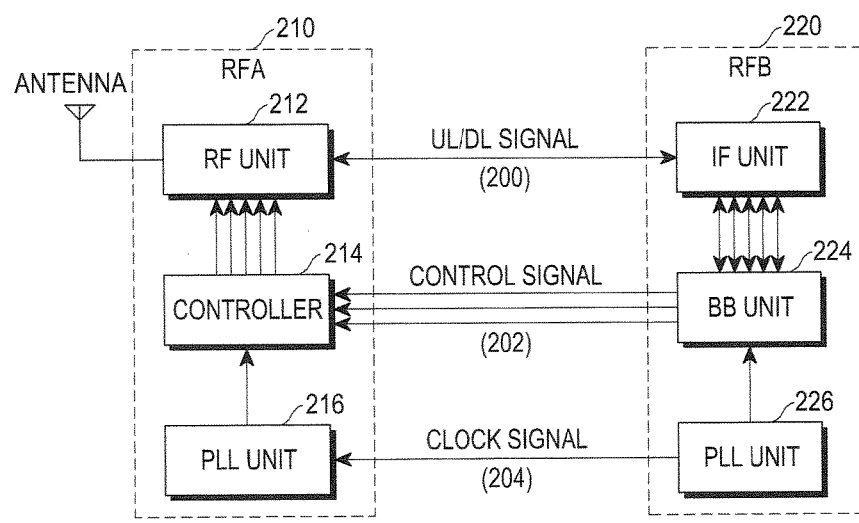
FIG. 2 illustrates signals transmitted and received between a general RFA and RFB.

FIG. 2 illustrates signals transmitted and received between a general RFA and RFB.

In FIG. 2, an RFA 210 may correspond to one of the first RFA 110 and the second RFA 120 in FIG. 1, and an RFB 220 may correspond to the RFB 130 in FIG. 1. Referring to FIG. 2, signals between the RFA 210 and the RFB 220 may be generally classified according to a signal type, and a plurality of channels may be used according to data amount.

Signals transferred between the RFA 210 and the RFB 220 may include a wireless signal for a communication with a base station, i.e., a uplink/downlink (UL/DL) signal 200 (for example, a data signal such as a voice signal or an image signal, and the like) which is transmitted from the terminal to the base station or from the base station to the terminal, a control signal 202 including a signal for adjusting beamforming which an RF unit of the RFA 210 uses, a signal for adjusting a circuit (for example, an automatic gain control (AGC) circuit) for controlling transmission and reception power of the terminal, and the like, a clock signal 204 that enables the RFA 210 and the RFB 220 to be synchronized, and the like.

The UL/DL signal 200 is transmitted and received between an RF unit 212 of the RFA 210 and an IF unit 222 of the RFB 220, the control signal 202 is transferred from the BB unit 224 to the controller 214, and the clock signal 204 is transferred from a phase locked loop (PLL) unit 226 to a PLL unit 216.

A connection structure between the RFA 210 and the RFB 220 shown in FIG. 2 will be more detailed described with reference to FIG. 3.

Figure 3:
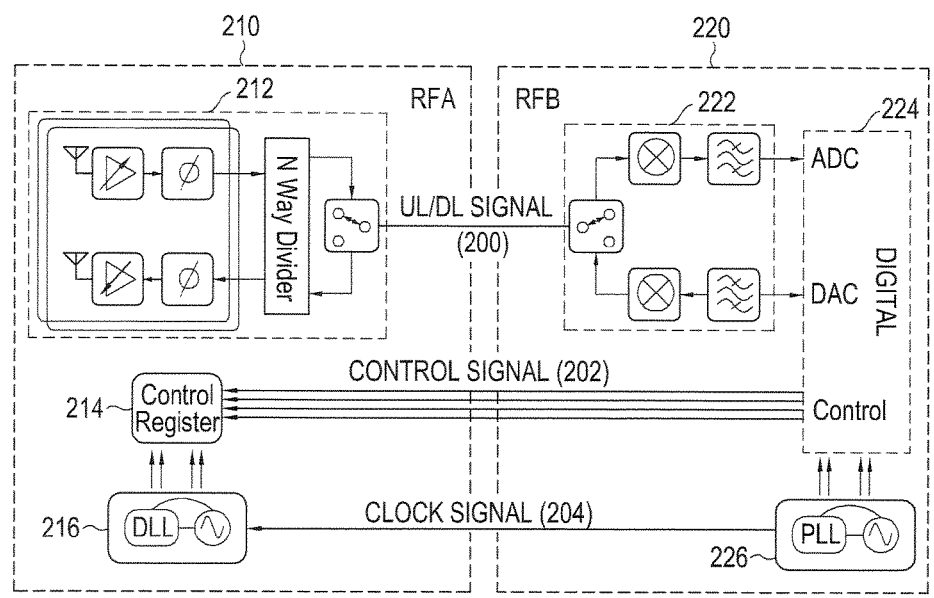
FIG. 3 illustrates a connection structure between a general RFA and RFB.

FIG. 3 illustrates a connection structure between a general RFA and RFB.

Referring to FIG. 3, as described above, signals between the RFA 210 and the RFB 220 may be classified into three types such as a UL/DL signal 200, a control signal 202, and a clock signal 204 according to a use purpose and usage. Here, the clock signal 204 may be a periodic signal with a 153.8 MHz frequency, the control signal 202 may be a 20 bit-signal synchronized with a 153.8 MHz clock, and the UL/DL signal 200 may be a signal which is modulated thereby having a bandwidth of 800 MHz at a center frequency of 27.925 GHz.

The clock signal 204 may be used for synchronization between individual inner functional blocks as well as the RFA 210 and the RFB 220. The control signal 202 is used for setting a parameter value of inner blocks of the RFA 210 and the RFB 220. Inner blocks in which parameter values need to be continuously changed according to a distance between the terminal and the base station and a location of the terminal and the base station are a phase shifter, a variable gain amplifier (VGA), and the like. The number of the control signal 202 may be two or more, and the plurality of control signals may be synchronized based on a rising edge or a falling edge of the clock signal 204 and transmitted to corresponding inner blocks of the RFA 210 and the RFB 220.

The UL/DL signal 200 may include a control information signal for synchronization between the terminal and the base station as well as an image signal and a voice signal for a user of the terminal. Here, a signal transmitted from the terminal to the base station is referred to as UL signal, and a signal transmitted from the base station to the terminal is referred to as DL signal. There are many schemes of transmitting the UL signal and the DL signal, a scheme of allocating the UL signal and the DL signal at different frequency bands and transmitting the UL signal and the DL signal at the same time is referred to as frequency-division duplexing (FDD) scheme, and a scheme of transmitting the UL signal and the DL signal at different time but it is impossible that the UL signal and the DL signal are allocated at the same frequency band to be transmitted at the same time will be referred to as time-division duplexing (TDD) scheme.

Various control information signals which enable a communication between the terminal and the base station may be allocated on a time axis and transmitted and received according to a preset frame structure.

In a case of deployment of the RFAs 110 and 120 and the RFB 130 as shown in FIG. 1 and a configuration in which signals are transferred as shown in FIGS. 2 and 3, the number of cables which need to be used in an inner part of a terminal may be exponentially increased proportional to the number of RFAs used for MIMO. Further, if the number of cables is increased, a mounting area according to mounting of a cable needs to be increased, so a severe limitation on an inner structure and deployment of the terminal may occur. Further, in a general RFA and RFB connecting scheme which uses a separate channel per type of signal, a channel for a signal with a high frequency uses an expensive cable, so increase of the number of cables may be burdened in an aspect of cost.

Figure 4:
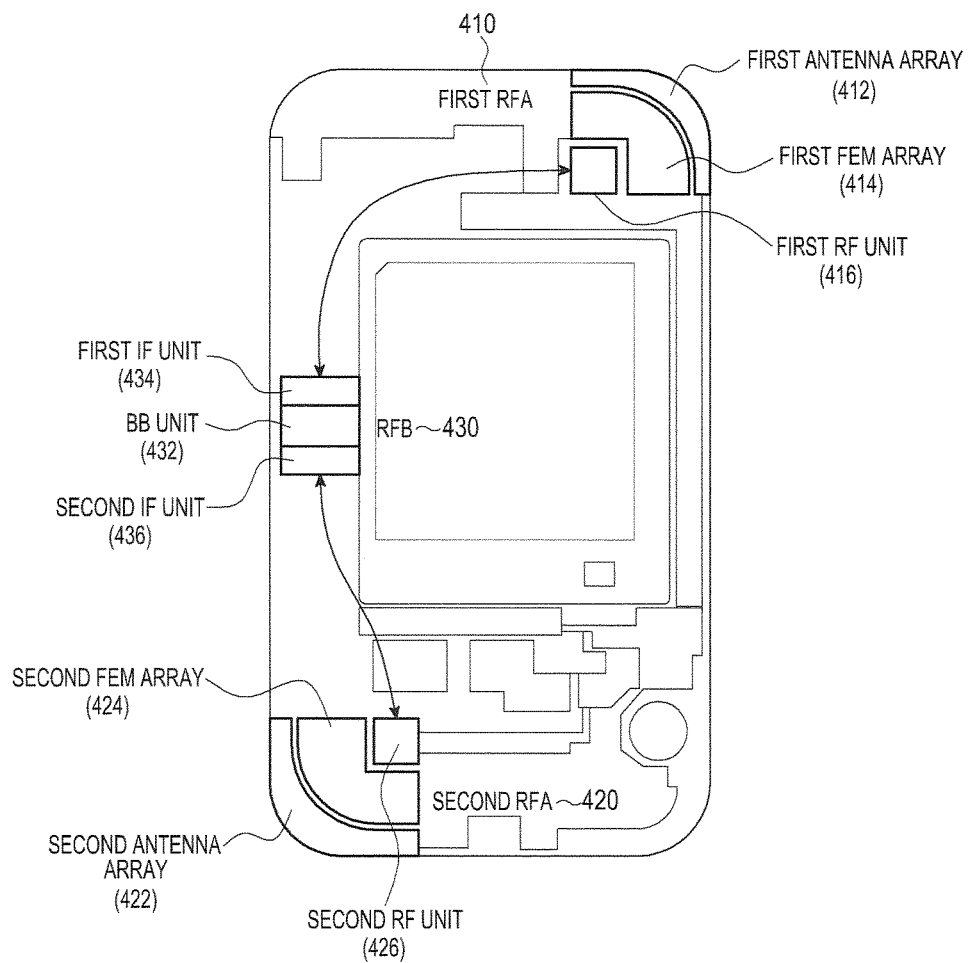
FIG. 4 illustrates a structure in which an RFA and an RFB are connected using one cable.

So, as shown in FIG. 4, a method of connecting an RFA and an RFB with one cable to use this may be considered.

FIG. 4 illustrates a structure in which an RFA and an RFB are connected using one cable.

Referring to FIG. 4, the first antenna array 412, the first FEM array 414, and the first RF unit 416 included in the first RFA 410 correspond to the first antenna array 112, the first FEM array 114, and the first RF unit 116 included in the first RFA 110 in FIG. 1, and the second antenna array 422, the second FEM array 424, and the second RF unit 426 included in the second RFA 420 correspond to the second antenna array 122, the second FEM array 124, and the second RF unit 126 included in the second RFA 120 in FIG. 1. And, a BB unit 432, the first IF unit 434 and the second IF unit 436 included in the RFB 430 correspond to the BB unit 132, the first IF unit 134 and the second IF unit 136 included in the RFB 130 in FIG. 1.

Unlike in FIG. 1, in FIG. 4, a connection between the first RFA 410 (or the second RFA 420) and the RFB 430 is established with one cable, not a plurality of cables. So, in FIG. 4, a component which may receive a UL/DL signal, a control signal, and a clock signal through one cable to identify and use the UL/DL signal, the control signal, and the clock signal on a frequency domain may be added. However, a component with a high complexity needs to be designed and included in an RFA and an RFB in order to identify and use the UL/DL signal, the control signal, and the clock signal on the frequency domain.

So, an embodiment of the present disclosure proposes a method and apparatus for embedding a clock signal into a control signal to transmit the control signal.

Hereinafter, a structure of an RFA and an RFB according to an embodiment of the present disclosure will be described with reference to FIG. 5.

Figure 5:
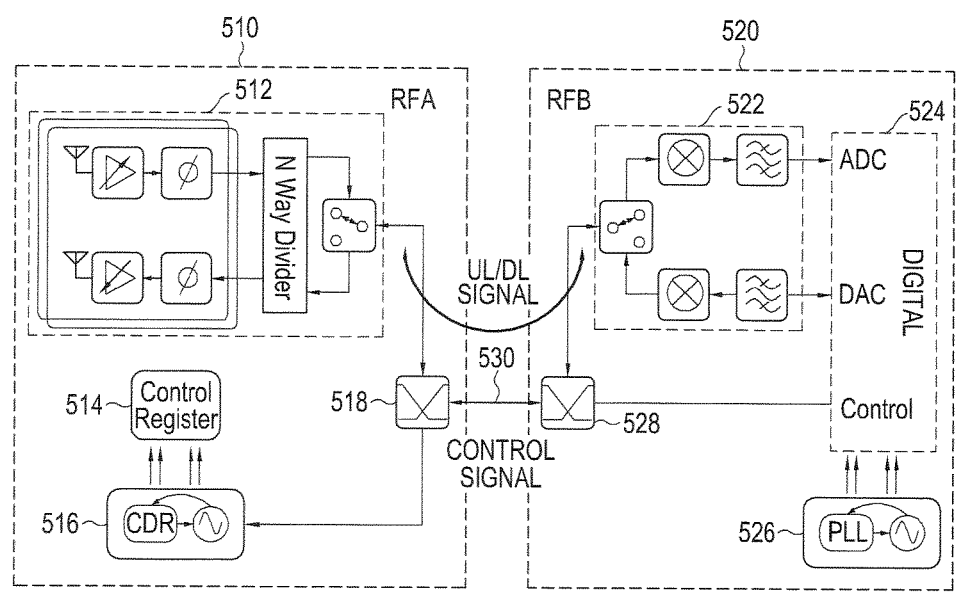
FIG. 5 schematically illustrates a connection structure of an RFA and an RFB according to an embodiment of the present disclosure.

FIG. 5 schematically illustrates a connection structure of an RFA and an RFB according to an embodiment of the present disclosure.

Referring to FIG. 5, an RFA 510 includes an RF unit 512, a controller 514, a clock signal detector 516, and a frequency selector 518. The RF unit 512 processes a signal transmitted and received through at least one antenna to perform an interface role with an air medium. Concretely, the RF unit 512 transfers a signal (for example, a DL signal) received from the at least one antenna to the frequency selector 518, or transmits a signal (for example, a UL signal) output from the frequency selector 518 through the at least one antenna.

The frequency selector 518 receives a UL/DL signal and a control signal from the RFB 520 or transfers the UL/DL signal and the control signal to the RFB 520. The RFA 510 and the RFB 520 are connected using one cable 530, so all of a UL/DL signal and a control signal between the RFA 510 and the RFB 520 are transmitted and received through the one cable 530.

Figure 6:
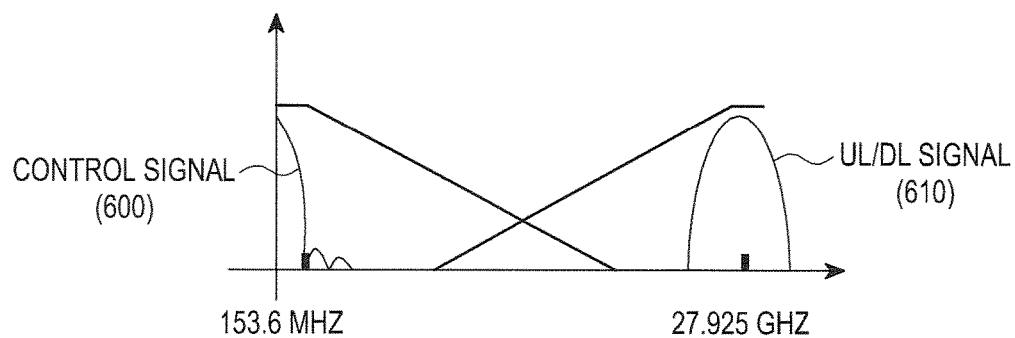
FIG. 6 is a graph illustrating a frequency band on which a control signal and a UL/DL signal are transmitted according to an embodiment of the present disclosure.

After a signal is received from the RFB 520, the frequency selector 518 classifies the received signal into a UL/DL signal and a control signal. Even though the UL/DL signal and the control signal are received through one cable, it is not difficult to identify the UL/DL signal and the control signal if a difference between a frequency component of the UL/DL signal and a frequency component of the control signal is large as shown in FIG. 6. Here, FIG. 6 is a graph illustrating a frequency band on which a control signal and a UL/DL signal are transmitted according to an embodiment of the present disclosure.

For example, if the UL/DL signal is 27.925 GHz (600), and the control signal is a signal of a frequency band of 153.6 MHz (610), there is about 20 times frequency difference between the UL/DL signal and the control signal, so it may be possible to identify the UL/DL signal and the control signal by using a simple filter. Here, the filter may be a filter which detects a UL/DL signal which is within the first frequency range (a frequency range in which a frequency band of the UL/DL signal is included) from a received signal, or a filter which detects a control signal which is within the second frequency range (a frequency range in which a frequency band of the control signal is included) from the received signal, and/or the like. After the UL/DL signal and the control signal are identified, the frequency selector 518 transfers the UL/DL signal to the RF unit 512, and transfers the control signal to the clock signal detector 516.

The clock signal detector 516 detects a clock signal from the control signal. Here, the control signal may be a signal including parameter values of inner components included in the RFA 510. The clock signal detector 516 may include a clock data recovery (CDR) unit and a voltage controlled oscillator (VCO). The CDR performs an operation of detecting a clock signal from a control signal and recovering a clock signal according to a voltage adjusted by the VCO. The operation of detecting the clock signal from the control signal will be described later.

The controller 514 may be configured as a form of a control register, and performs an operation of setting parameter values of inner components of the RFA 510 based on a control signal output from the clock signal detector 516.

The RFB 520 includes an IF unit 522, a BB unit 524, a PLL unit 526, and a frequency selector 528. The IF unit 522 transfers a signal (for example, a DL signal) output from the frequency selector 528 to the BB unit 524, or outputs a signal (for example, a UL signal) to the frequency selector 528. The IF unit 522 may perform an operation of converting an analog signal output from the frequency selector 528 into a digital signal to demodulate the digital signal, an operation of converting a digital signal output from the BB unit 524 into an analog signal to modulate the analog signal, and the like.

The BB unit 524 is configured as a digital logic, and performs an operation of generating a control signal, a UL signal, and the like, and processing a received signal. Specially, the BB unit 524 may embed a clock signal generated in the PLL unit 526 into a control signal using a line coding scheme. Here, at least one of a manchester line coding scheme, an 8b10b line coding scheme, a non-return to zero (NRZ) line coding scheme, and a return to zero (RZ) line coding scheme may be used as the line coding scheme. The control signal including the clock signal is output to the frequency selector 528.

The PLL unit 526 generates the clock signal to output the clock signal to the BB unit 524. The frequency selector 528 transfers a signal (for example, a UL signal) output from the IF unit 522 to the RFA 510 or outputs a signal (for example, a DL signal) input from the RFA 510 to the IF unit 522. The frequency selector 528 transfers a control signal output from the BB unit 524 to the RFA 510. The control signal and the UL signal output from the frequency selector 528 may be transferred to the RFA 510 through one cable 530.

When a signal is received from the RFA 510, similar to the frequency selector 518, the frequency selector 528 may perform an operation of identifying the UL/DL signal and the control signal from the received signal, and the like. Here, the frequency selector 528 may perform the signal identifying operation using a filter which is based on a frequency band, and the like.

Next, a process of detecting a clock signal from a control signal according to an embodiment of the present disclosure will be described with reference to FIG. 7.

Figure 7:
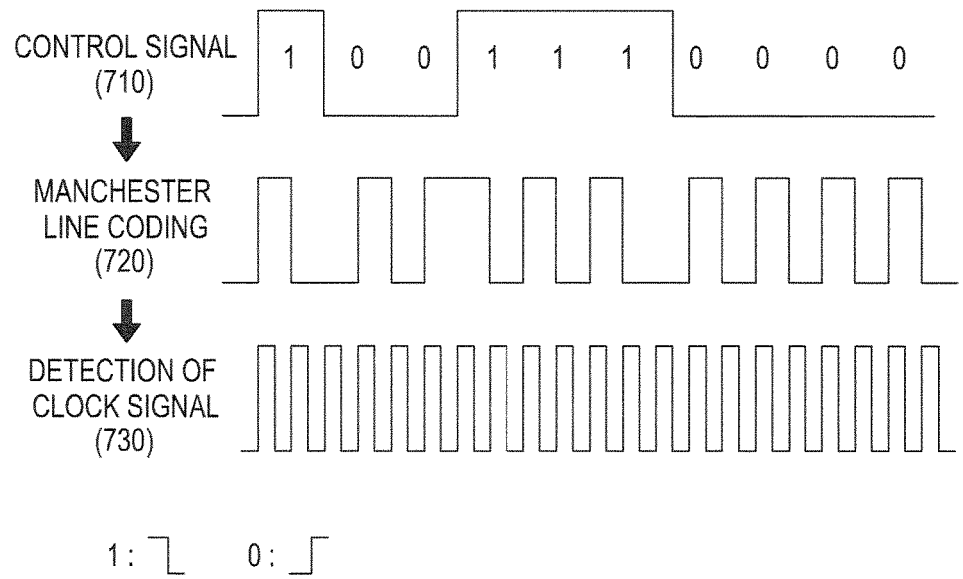
FIG. 7 illustrates a process of detecting a clock signal from a control signal according to an embodiment of the present disclosure.

FIG. 7 illustrates a process of detecting a clock signal from a control signal according to an embodiment of the present disclosure.

FIG. 7 shows an example of a case that the clock signal detector 516 of the RFA 510 receives a control signal "1001110000" (710). If a clock signal is embedded into a control signal based on a manchester line coding scheme, the clock signal detector 516 converts the control signal using the manchester code (720). DC of the manchester code has been balanced, data corresponding to "1" is converted into data for which voltage change from 1 to 0 ("1→0") occurs and data corresponding to "0" is converted into data for which voltage change from 0 to 1 ("0→1") occurs in a case that the manchester code is applied to a control signal.

The clock signal detector 516 detects the clock signal based on a rising edge pattern or a falling edge pattern of the converted data (730). For example, the clock signal detector 516 may detect the clock signal by considering that a rising edge of the converted data is identical to a rising edge of the clock signal. Additionally, the clock signal detector 516 may detect the clock signal by considering that a pattern of the clock signal has a pattern which is N(N≥2) times faster than a pattern of the converted data.

As described above, in an embodiment of the present disclosure, the RFA 510 and the RFB 520 are connected using one cable 530, and are possible to transmit the UL/DL signal and the control signal at the same time through one cable 530.

Further, in an embodiment of the present disclosure, the RFB 520 line codes a control signal to transmit the line coded control signal instead of modulating the control signal, so the RFA 510 may detect the clock signal from the control signal.

Further, an embodiment of the present disclosure may effectively identify the UL/DL signal and the control signal using a simple filter even though the UL/DL signal and the control signal are transmitted at the same time.

Next, a structure of a UL/DL frame according to an embodiment of the present disclosure will be described with reference to FIG. 8.

Figure 8:
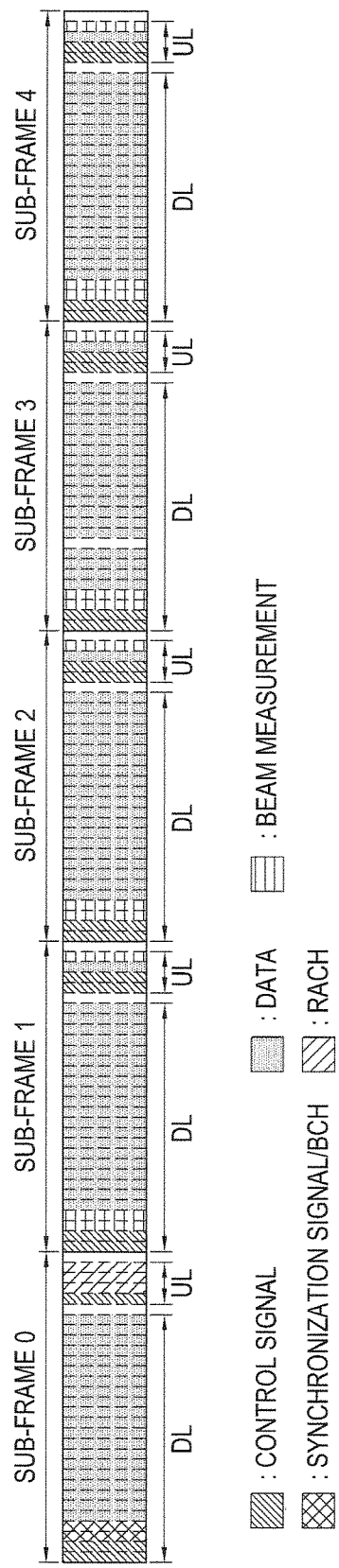
FIG. 8 illustrates a structure of a UL/DL frame according to an embodiment of the present disclosure.

FIG. 8 illustrates a structure of a UL/DL frame according to an embodiment of the present disclosure.

In an embodiment of the present disclosure, wireless signals transmitted and received between a base station and a terminal may be transmitted and received based on a UL/DL frame structure as shown in FIG. 8. Referring to FIG. 8, one frame has a size of 5 ms and may include a plurality of sub-frames.

Control information signals which enable to maintain a communication between the base station and the terminal may include a control signal between a base station and a terminal, a synchronization signal between the base station and the terminal and a broadcast channel (BCH) signal, a random access channel (RACH) signal, a signal for setting wireless parameter setting (for example, a signal for beam measurement, a signal for DL and UL conversion, and a signal for automatic gain control (AGC)), and the like. Corresponding signals may be allocated on a time axis according to a frame structure shown as FIG. 8 and be transmitted and received.

This will be described with FIG. 9 which concretely illustrates sub-frames included in a frame in FIG. 8.

Figure 9:
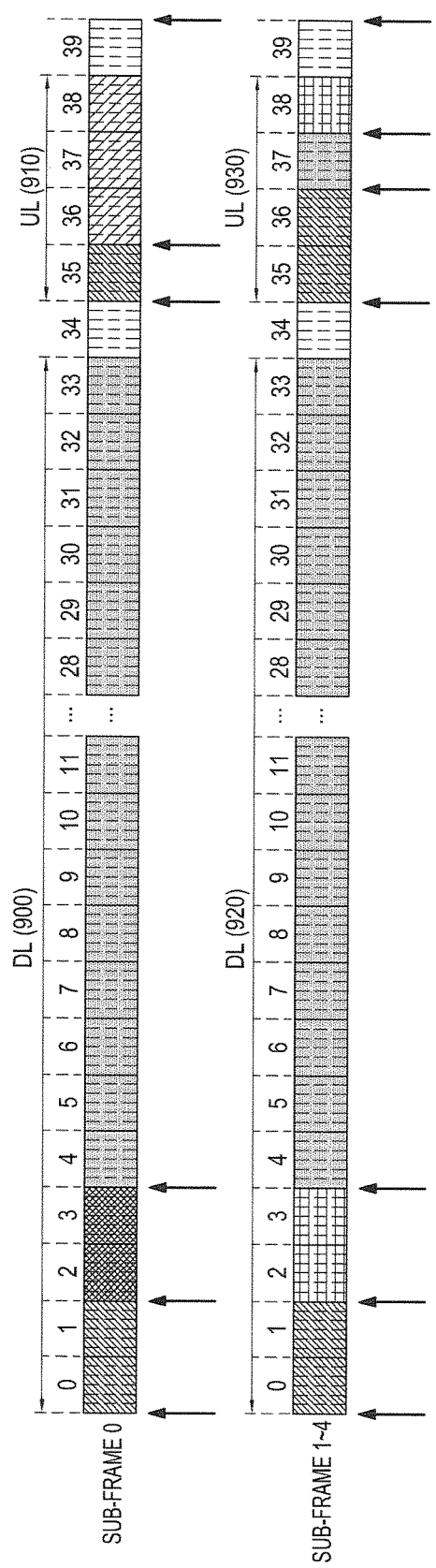
FIG. 9 illustrates a configuration of a sub-frame according to an embodiment of the present disclosure.

FIG. 9 illustrates a configuration of a sub-frame according to an embodiment of the present disclosure.

A sub-frame 0 as the first sub-frame and sub-frames 1-4 as remaining sub-frames shown as an example in FIG. 8 are shown in FIG. 9.

Referring to FIG. 9, each of sub-frames 1-4 includes the same number of symbols (for example, 40 symbols), and one sub-frame includes a DL interval and a UL interval.

Referring to a DL interval 900 of the sub-frame 0, a control signal for a communication between the base station and the terminal is transmitted to the terminal on the 0th and the 1th symbols, and a synchronization signal for synchronization between the base station and the terminal and a BCH signal are transmitted to the terminal on the 2nd and the 3rd symbols, and DL data is transmitted to the terminal on the 4th and the 33th symbols.

Referring to a UL interval 910 of the sub-frame 0 which is started after a term of the 34th symbol, a control signal for a communication with the base station is transmitted to the base station on the 35th symbol, and an RACH signal for a random access is transmitted on the 36th and the 38th symbols.

Control information signals for enabling to initiate a communication between the base station and the terminal may be transmitted and received on the sub-frame 0, and control information signals for enabling to maintain the communication between the base station and the terminal may be transmitted and received on remaining sub-frames.

Referring to a DL interval 910 of the sub-frames 1 to 4, a control signal for maintaining the communication between the base station and the terminal is transmitted to the base station on the 0th and the 1th symbols, a signal for beam measurement for beamforming is transmitted on the 2th and the 3th symbols, and DL data is transmitted on the 4th and the 33th symbols.

Referring to a UL interval 930 of the sub-frames 1-4 which is started after a term of the 34th symbol, a control signal for maintaining the communication with the base station is transmitted to the base station on the 35th and the 36th symbols, UL data is transmitted to the base station on the 37th symbol, and a signal for beam measurement for beamforming is transmitted to the base station on the 38th symbol.

Meanwhile, a transmission interval for a control information signal may be used with various forms. This will be described with reference to FIG. 10.

Figure 10:
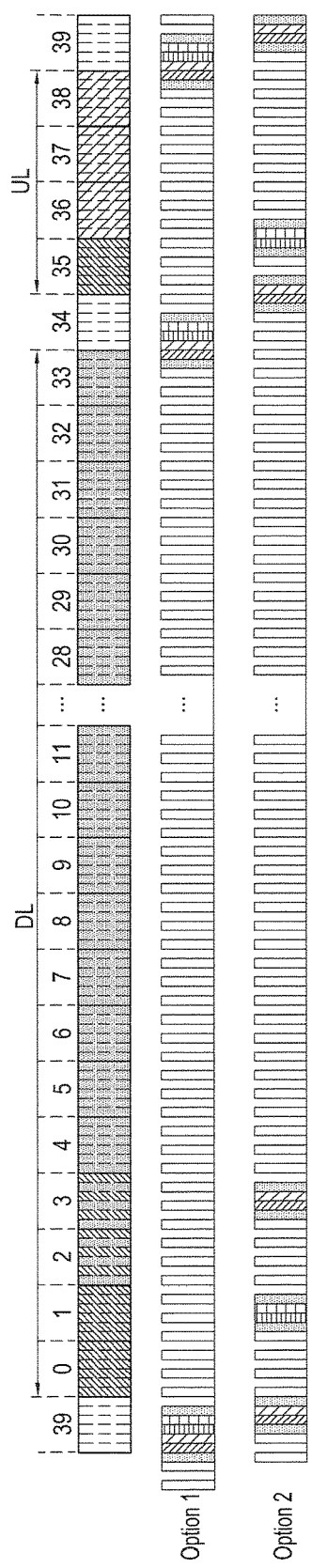
FIG. 10 illustrates an example of a transmission interval for a control information signal according to an embodiment of the present disclosure.

FIG. 10 illustrates an example of a transmission interval for a control information signal according to an embodiment of the present disclosure.

Referring to FIG. 10, as shown in option 1, a transmission interval for a control information signal may be set such that various control information signals are transmitted all together. For example, according to this setting, DL data may be transmitted after all of control information signals which need to be transmitted on a DL interval are transmitted. Further, UL data may be transmitted after all of control information signals which need to be transmitted on a UL interval are transmitted. In FIG. 10, control information signals are shown as shaded, and DL or UL data is shown as transparent.

Meanwhile, as shown in option 2, the transmission interval for the control information signal may be set such that the various control information signals are transmitted individually. For example, according to this setting, a transmission interval on which each control information signal is transmitted may be different. The transmission interval for the control information signal is not limited to a form as shown in FIG. 10 and is possible to be implemented as various forms.

Next, an operation of an RFA and an RFB according to an embodiment of the present disclosure will be described below.

Figure 11:
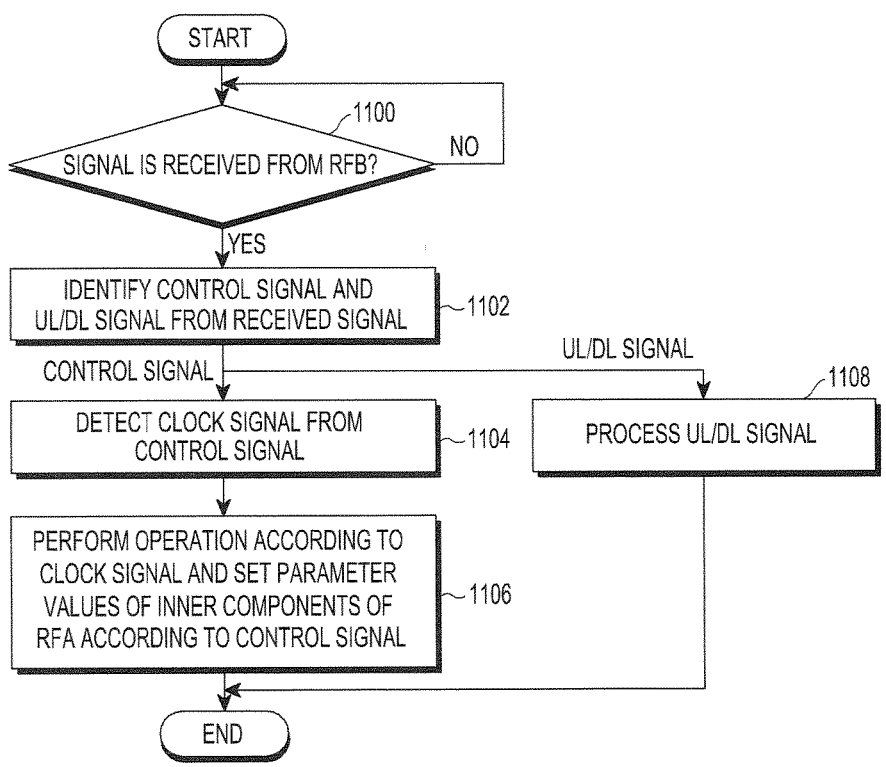
FIG. 11 is a flowchart illustrating an operation of an RFA according to an embodiment of the present disclosure.

FIG. 11 is a flowchart illustrating an operation of an RFA according to an embodiment of the present disclosure.

Referring to FIG. 11, the RFA determines whether a signal is received from an RFB through one cable at step 1100. Upon receiving the signal from the RFB, the RFA identifies a control signal and a UL/DL signal from the received signal at step 1102. A difference between a frequency component of the control signal and a frequency component of the UL/DL signal is large, so the RFA may identify the control signal and the UL/DL signal using a filter, and the like.

In a case of the control signal, the RFA detects a clock signal from the control signal at step 1104. The clock signal may be detected based on a method as shown in FIG. 7. The RFA performs an operation according to timing which is based on the detected clock signal and sets parameter values of inner components of the RFA according to the control signal at step 1106.

Meanwhile, in a case of the UL/DL signal, the RFA processes the UL/DL signal at step 1108. For example, upon receiving a UL signal, the RFA may transmit the received UL signal to a base station through an antenna.

Although FIG. 11 illustrates an operation of an RFA according to an embodiment of the present disclosure, various changes could be made to FIG. 11. For example, although shown as a series of operations, various operations in FIG. 11 could overlap, occur in parallel, occur in a different order, or occur multiple times.

Next, an operation of an RFB according to an embodiment of the present disclosure will be described with reference to FIG. 12.

Figure 12:
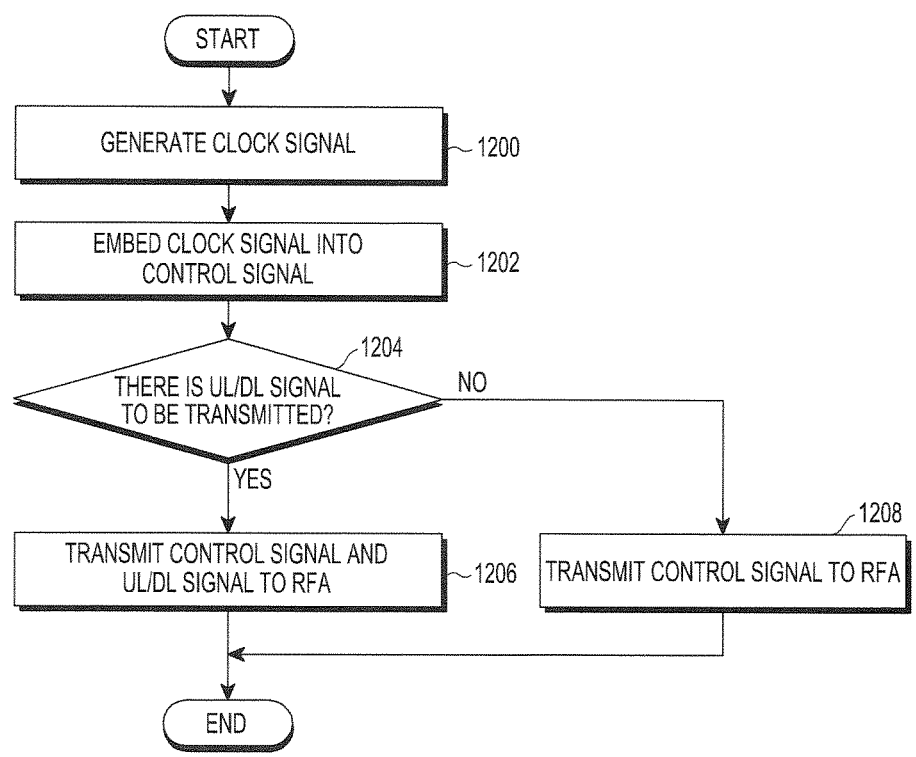
FIG. 12 is a flowchart illustrating an operation of an RFB according to an embodiment of the present disclosure.

FIG. 12 is a flowchart illustrating an operation of an RFB according to an embodiment of the present disclosure.

Referring to FIG. 12, the RFB generates a clock signal at step 1200, and embeds the generated clock signal into a control signal at step 1202. For example, the RFB may imbed the clock signal into the control signal based on a line coding scheme such as a manchester line coding scheme, and the like.

The RFB determines whether there is a UL/DL signal to be transmitted at step 1204. If there is the UL/DL signal to be transmitted, the RFB transmits the UL/DL signal along with the control signal to the RFA at step 1206. If there is no UL/DL signal to be transmitted, the RFB transmits the control signal to the RFA at step 1208.

Although FIG. 12 illustrates an operation of an RFB according to an embodiment of the present disclosure, various changes could be made to FIG. 12. For example, although shown as a series of operations, various operations in FIG. 12 could overlap, occur in parallel, occur in a different order, or occur multiple times.

Meanwhile, in a general terminal as shown in FIG. 2 and FIG. 3, power of an RFA is controlled by an RFB. For example, upon receiving a power control signal generated in a BB unit of an RFB on a power save mode, an RFA performs a power up operation to transition to an active mode. This power control operation may be performed in a case that the power control signal is a signal of a low frequency less than hundreds of MHz, the RFA and the RFB are located close within a preset distance, and the RFA and the RFB are configured as a system on chip (SoC) form.

Meanwhile, in a case that an RFA and an RFB are connected using one cable according to an embodiment of the present disclosure, a power control operation may be directly performed by a BB unit in an RFB, so power saving operation may be easily performed. However, the RFA needs to continuously check whether a power control signal is received, so it is difficult to perform a power saving operation. Concretely, in the RFB, a modulator/demodulator (MOD/DeMOD) for demodulating a signal received from the RFB needs to be always on a power on state for detecting whether a power control signal is received from the RFB. In this case, power amount consumed in the RFA is greater than power amount consumed on a sleep mode by dozens of mA.

Further, a loss value of a cable to be connected and a loss value of a printed circuit board (PCB) are exponentially increased when a frequency becomes high, so there is a need for much cost for decreasing a corresponding loss value in a case that a MIMO technology, an mmWave technology, and the like are considered. So, the following method for decreasing power consumption of an RFA may be used by considering an issue as described above.

An inner structure of a power control apparatus to control power of an RFA according to an embodiment of the present disclosure will be described with reference to FIG. 13.

Figure 13:
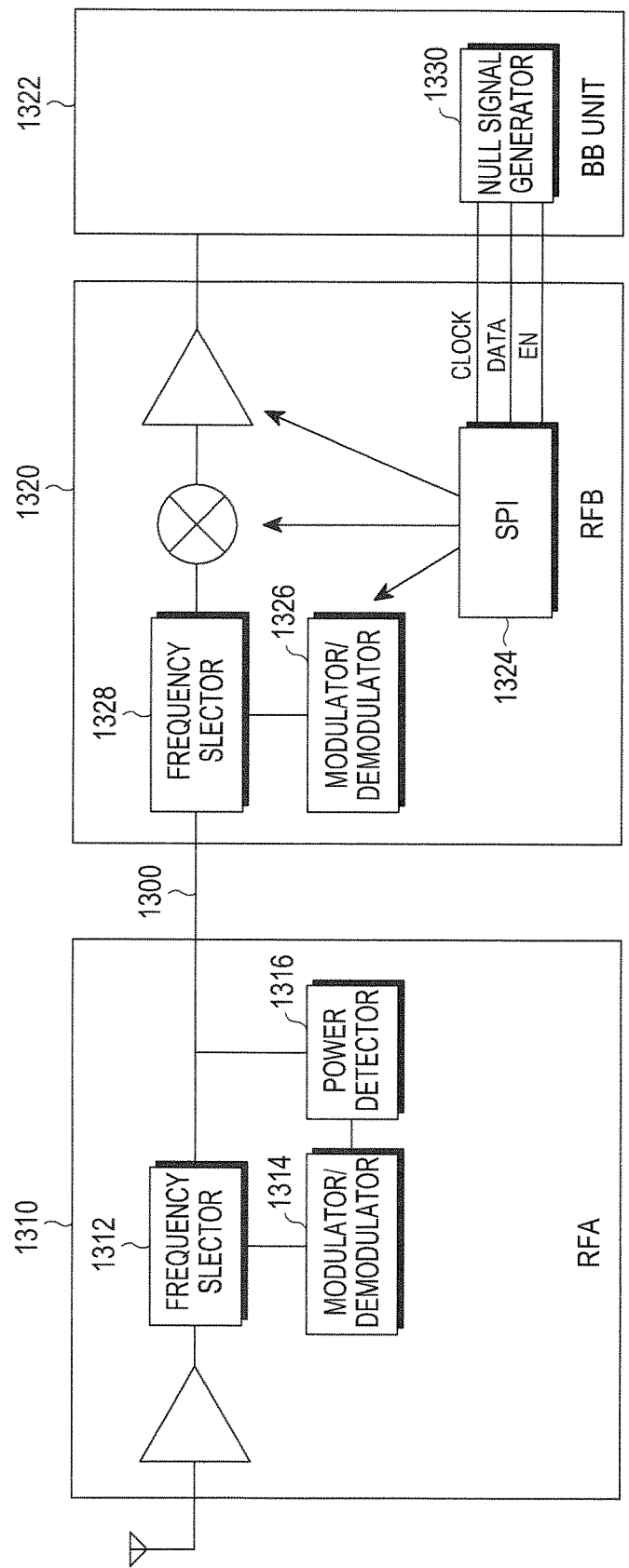
FIG. 13 schematically illustrates an inner structure of a power control apparatus to control power of an RFA according to an embodiment of the present disclosure.

FIG. 13 schematically illustrates an inner structure of a power control apparatus to control power of an RFA according to an embodiment of the present disclosure.

Referring to FIG. 13, the power control apparatus performs an operation of controlling power of an RFA 1310, and may include a plurality of components included in the RFA 1310 and an RFB 1320 which are connected using one cable 1300.

Firstly, components included in the RFB 1320 will be described. The RFB 1320 includes a BB unit 1322, a serial peripheral interface (SPI) 1324, a modulator/demodulator 1326, and a frequency selector 1328.

The BB unit 1322 performs an operation which corresponds to a BB unit 524 in FIG. 5, and generates and outputs a control signal, a signal for a communication with a base station, and the like. Specially, the BB unit 1322 includes a null signal generator 1330, and the null signal generator 1330 generates a null signal for power off of the RFA 1310.

The null signal generator 1330 generates the null signal under a control of the BB unit 1322. Upon determining that an operation of the RFA 1310 does not need to be performed, the BB unit 1322 controls the null signal generator 1330 to generate the null signal. For example, if a menu which makes not to perform signal transmission and reception through an antenna is selected by a terminal user, or if it is determined that an operation of the RFA 1310 does not need to be performed according that the BB unit 1322 generates a UL signal, and the like or processes a received signal, the BB unit 1322 may control the null signal generator 1330 to generate the null signal.

The BB unit 1322 outputs the generated null signal. The BB unit 1322 outputs a control signal into which a clock signal is embedded if the null signal is not generated.

The SPI 1324 performs an interface role which enables the BB unit 1322 and the modulator/demodulator 1326, or the BB unit 1322 and an IF unit to exchange data, signal, and the like with a serial communication. For example, the null signal or the control signal into which the clock signal is embedded is output from the BB unit 1322, the SPI 1324 outputs a corresponding signal to the modulator/demodulator 1326.

The modulator/demodulator 1326 modulates the signal output from the SPI 1324 or demodulates the signal output from the frequency selector 1328. The signal modulated in the modulator/demodulator 1326 is transmitted to the RFA 1310 through the frequency selector 1328 and the cable 1300. The frequency selector 1328 performs an operation of identifying a signal to be transmitted or a received signal.

The RFA 1310 includes a frequency selector 1312, a modulator/demodulator 1314, and a power detector 1316.

The frequency selector 1312 performs an operation of identifying a signal to be transmitted or a received signal. For example, upon receiving a signal from the RFB 1320, the frequency selector 1312 identifies a UL/DL and a control signal from a received signal to output the UL/DL and the control signal to the modulator/demodulator 1314.

The modulator/demodulator 1314 performs an operation of demodulating the signal output from the frequency selector 1312 or modulating a signal to be output to the frequency selector 1312.

The power detector 1316 is located after the cable 1300, and determines whether a control signal is received or a null signal is received through the cable 1300. The control signal always includes a clock signal, and the null signal does not include a clock signal and a control signal and includes only a VDD value. Based on this, the power detector 1316 may determine whether the control signal is received or whether the null signal is received. Meanwhile, the clock signal may be detected from the control signal using a method of detecting a clock signal based on a manchester code as shown in FIG. 7.

Upon receiving the control signal, the power detector 1316 recognizes that an activation operation for the RFA 1310 needs to be performed and outputs a signal instructing to perform a power on operation such that power is continuously provided to the RFA 1310. Upon receiving the null signal, the power detector 1316 recognizes that an idle operation for the RFA 1310 needs to be performed and outputs a signal instructing to perform a power off operation.

The signal output from the power detector 1316 is output to a controller which performs an operation of setting parameter values of inner components of the RFA 1310 and the like, is configured as a form of a control register, and controls the inner components, so a power control operation for the RFA 1310 may be performed.

For example, if the signal to instruct to perform the power on operation is output from the power detector 1316, the controller may provide power to the frequency selector 1312, the modulator/demodulator 1314, and the like. If the signal to instruct to perform the power off operation is output from the power detector 1316, the controller may stop a power providing operation to the frequency selector 1312, the modulator/demodulator 1314, and the like.

Even though the signal to instruct to perform the power off operation is output, the power detector 1316 may be on a power on state. The power detector 1316 operates with low power, so power consumption of the RFA 1310 is not great even though the power detector 1316 is always on the power on state.

While the RFA 1310 and the RFB 1320 are described in the power control apparatus as separate units in FIG. 13, however, the power control apparatus may be implemented with one processor.

While the frequency selector 1312, the modulator/demodulator 1314 and the power detector 1316 are described in the RFA 1310 as separate units, however, the RFA 1310 may be implemented as a form that at least two of the frequency selector 1312, the modulator/demodulator 1314 and the power detector 1316 are incorporated into a single unit. The RFA 1310 may be implemented with one processor.

While the BB unit 1322, the SPI 1324, the modulator/demodulator 1326, and the frequency selector 1328 are described in the RFB 1320 as separate units, however, the RFB 1320 may be implemented as a form that at least two of the BB unit 1322, the SPI 1324, the modulator/demodulator 1326, and the frequency selector 1328 are incorporated into a single unit. The RFB 1320 may be implemented with one processor.

An inner structure of a power control apparatus to control power of an RFA according to an embodiment of the present disclosure has been described with reference to FIG. 13, and a VDD value used for power control of an RFA according to an embodiment of the present disclosure will be described with reference to FIGS. 14A and 14B.

Figure 14A:
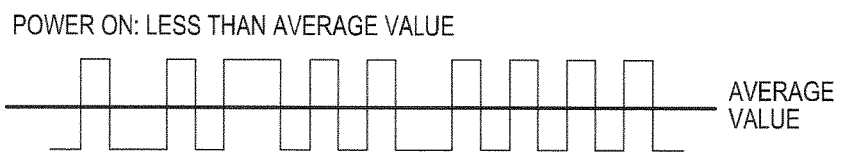
FIGS. 14A and 14B are graphs illustrating a VDD value used for power control of an RFA according to an embodiment of the present disclosure.
Figure 14B:

FIGS. 14A and 14B are graphs illustrating a VDD value used for power control of an RFA according to an embodiment of the present disclosure.

Referring to FIG. 14A, upon detecting the control signal, the power detector 1316 calculates an average value of control signals received during a preset time interval, i.e., an average power value. If a currently set voltage value is less than the average power value, the power detector 1316 outputs a signal to instruct to perform a power on operation. Otherwise, the power detector 1316 outputs a signal to instruct to perform a power off operation. The control signal always includes a clock signal on an active state, so the control signal has a specific VDD value and may be used as the basis of the power control operation as described above.

Meanwhile, the null signal is used for the idle state of the RFA 1310, so the null signal does not include a control signal and a clock signal and may have only a VDD value as shown in FIG. 14B. So, the power detector 1316 may output a signal to instruct to perform a power off operation upon detecting only a VDD value.

A VDD value used for power control of an RFA according to an embodiment of the present disclosure has been described with reference to FIGS. 14A and 14B, and a process of controlling power of an RFA according to an embodiment of the present disclosure will be described with reference to FIG. 15.

Figure 15:
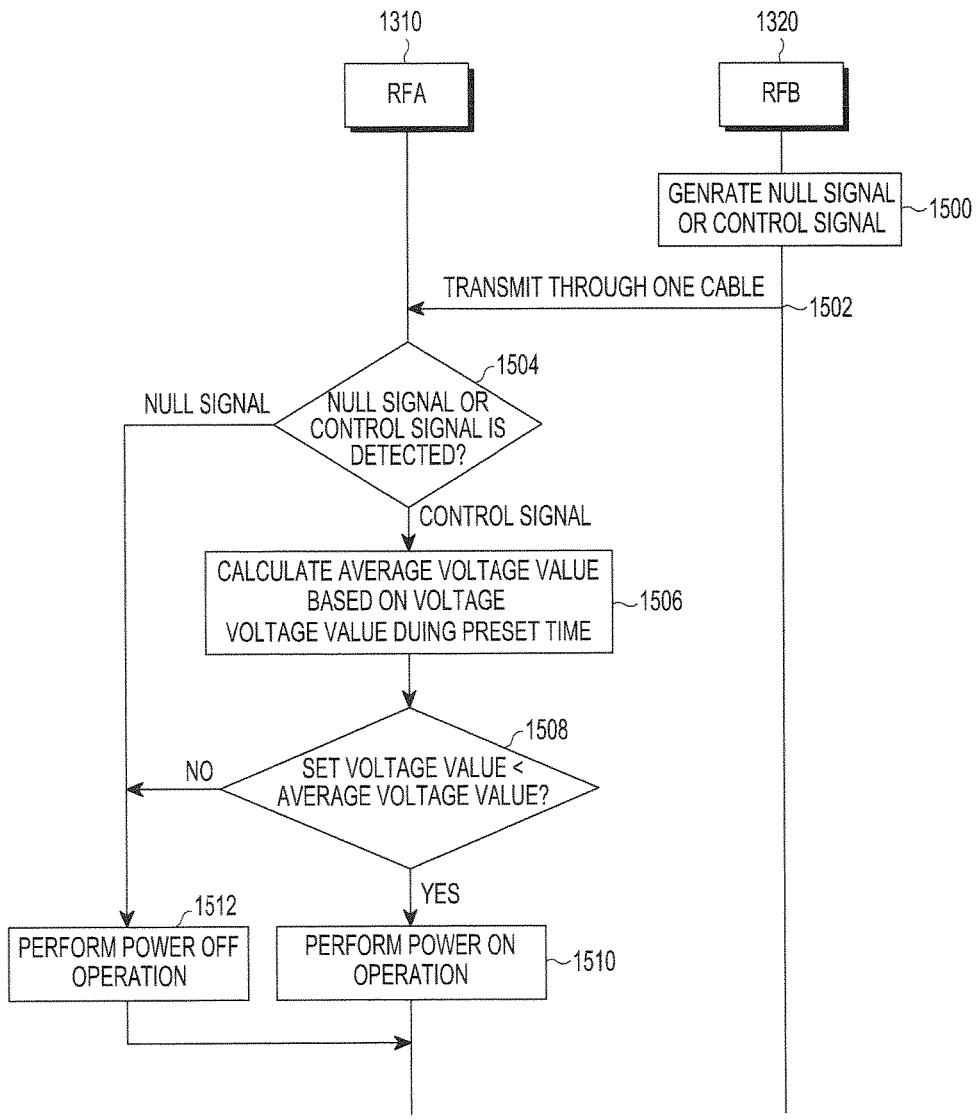
FIG. 15 is a signal flow illustrating a process of controlling power of an RFA according to an embodiment of the present disclosure.

FIG. 15 is a signal flow illustrating a process of controlling power of an RFA according to an embodiment of the present disclosure.

Referring to FIG. 15, an RFB 1320 generate a null signal for power off of the RFA 1310 or a control signal for power on of the RFA 1310 at step 1500. The RFB 1320 modulates the generated signal to transmit the modulated signal to the RFA 1310 through one cable at step 1502.

The RFA 1310 detects the null signal or the control signal from a received signal at step 1504. If the null signal is detected, the RFA 1310 proceeds to step 1512, and performs a power off operation.

If the control signal is detected, the RFA 1310 calculates an average power value based on a power value during preset time at step 1506. Then, the RFA 1310 determines whether a set power value is less than the average power value at step 1508. If the set power value is less than the average power value, the RFA 1310 performs a power on operation at step 1510. Otherwise, the RFA 1310 proceeds to step 1512, and performs a power off operation.

Although FIG. 15 illustrates a process of controlling power of an RFA according to an embodiment of the present disclosure, various changes could be made to FIG. 15. For example, although shown as a series of operations, various operations in FIG. 15 could overlap, occur in parallel, occur in a different order, or occur multiple times.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A radio frequency (RF) processing apparatus, the RF processing apparatus comprising:
   at least one antenna;
   an RF processor configured to perform a communication with a base station using the at least one antenna;
   a frequency selector configured to:
      receive a signal from an intermediate frequency (IF) processing apparatus, and
      identify, from the received signal, a signal for the communication with the base station and a control signal into which a clock signal is embedded using a coding scheme;
   a clock signal detector configured to:
      convert the control signal into a first voltage variation pattern using a code corresponding to the coding scheme, and
      change the first voltage variation pattern into a second voltage variation pattern based on a rule, and detect the clock signal from the second voltage variation pattern; and
   a controller configured to perform an operation based on the control signal according to timing that is based on the clock signal.

2. The RF processing apparatus of claim 1, wherein a frequency band on which the signal for the communication with the base station is transmitted is different from a frequency band on which the control signal is transmitted.

3. The RF processing apparatus of claim 1, wherein the coding scheme includes a line coding scheme, and
   wherein the line coding scheme includes one of a Manchester line coding scheme, an 8b10b line coding scheme, a non-return to zero (NRZ) line coding scheme, and a return to zero (RZ) line coding scheme.

4. The RF processing apparatus of claim 1, wherein the control signal includes information for changing parameter values of components included in the RF processing apparatus.

5. The RF processing apparatus of claim 1, further comprising:
a power detector,
wherein the power detector is configured to:
detect one of the control signal or a null signal from the received signal,
calculate an average voltage value by measuring a voltage value of the control signal during a preset time if the control signal is detected,
output, to the controller, a signal instructing to perform a power input operation for the RF processing apparatus if a voltage value input to the RF processing apparatus is less than the average voltage value, and
output, to the controller, a signal instructing to stop the power input operation if the null signal is detected.

6. An intermediate frequency (IF) processing apparatus, the IF processing apparatus comprising:
a clock signal generator configured to generate a clock signal for acquiring synchronization with a radio frequency (RF) processing apparatus;
a baseband processor configured to:
generate a control signal and a signal for a communication with a base station, and
embed the clock signal into the control signal using a coding scheme; and
a frequency selector configured to:
transmit the control signal into which the clock signal is embedded and the signal for the communication with the base station to the RF processing apparatus,
wherein the clock signal is detected from a second voltage variation pattern in the RF processing apparatus, and the second voltage variation pattern is obtained by converting the control signal into a first voltage variation pattern using a code corresponding to the coding scheme and changing the first voltage variation pattern into the second voltage variation pattern based on a rule.

7. The IF processing apparatus of claim 6, further comprising:
an intermediate frequency (IF) processor configured to process the signal for the communication with the base station,
wherein, if a signal is received from the RF processing apparatus, the frequency selector is configured to detect a downlink signal received from the base station from the received signal to output the downlink signal.

8. The IF processing apparatus of claim 6, wherein the coding scheme includes a line coding scheme, and
wherein the line coding scheme includes one of a Manchester line coding scheme, an 8b10b line coding scheme, a non-return to zero (NRZ) line coding scheme, and a return to zero (RZ) line coding scheme.

9. The IF processing apparatus of claim 6, wherein the control signal includes information for changing parameter values of components included in the RF processing apparatus.

10. The IF processing apparatus of claim 6, wherein the baseband processor is configured to output, to the frequency selector, one of a null signal for stopping a power input operation for the RF processing apparatus or the control signal for instructing to perform the power input operation for the RF processing apparatus.

11. A method of a radio frequency (RF) processing apparatus, the method comprising:
receiving a signal from an intermediate frequency (IF) processing apparatus;
identifying, from the received signal, a signal for a communication with a base station and a control signal into which a clock signal is embedded using a coding scheme;
converting the control signal into a first voltage variation pattern using a code corresponding to the coding scheme, changing the first voltage variation pattern into a second voltage variation pattern based on a rule, and detecting the clock signal from the second voltage variation pattern; and
performing an operation based on the control signal according to timing that is based on the clock signal.

12. The method of claim 11, wherein a frequency band on which the signal for the communication with the base station is transmitted is different from a frequency band on which the control signal is transmitted.

13. The method of claim 11, wherein the coding scheme includes a line coding scheme, and
wherein the line coding scheme includes one of a Manchester line coding scheme, an 8b10b line coding scheme, a non-return to zero (NRZ) line coding scheme, and a return to zero (RZ) line coding scheme.

14. The method of claim 11, wherein the control signal includes information for changing parameter values of components included in the RF processing apparatus.

15. The method of claim 11, further comprising:
detecting one of the control signal or a null signal from the received signal;
calculating an average voltage value by:
measuring a voltage value of the control signal during a preset time if the control signal is detected, and
performing a power input operation for the RF processing apparatus if a voltage value input to the RF processing apparatus is less than the average voltage value; and
stopping the power input operation if the null signal is detected.

16. A method of an intermediate frequency (IF) processing apparatus, the method comprising:
generating a clock signal for synchronizing with a radio frequency (RF) processing apparatus;
generating a control signal and a signal for a communication with a base station;
embedding the clock signal into the control signal based on a coding scheme; and
transmitting the control signal into which the clock signal is embedded and the signal for the communication with the base station to the RF processing apparatus,
wherein the clock signal is detected from a second voltage variation pattern in the RF processing apparatus, and the second voltage variation pattern is obtained by converting the control signal into a first voltage variation pattern using a code corresponding to the coding scheme and changing the first voltage variation pattern into the second voltage variation pattern based on a rule.

17. The method of claim 16, further comprising:
if a signal is received from the RF processing apparatus, detecting a downlink signal received from the base station from the received signal to process the detected downlink signal.

18. The method of claim 16, wherein the coding scheme includes a line coding scheme, and
wherein the line coding scheme includes one of a Manchester line coding scheme, an 8b10b line coding scheme, a non-return to zero (NRZ) line coding scheme, and a return to zero (RZ) line coding scheme.

19. The method of claim 16, wherein the control signal includes information for changing parameter values of components included in the RF processing apparatus.

20. The method of claim 16, further comprising:
   transmitting, to the RF processing apparatus, one of a null signal for stopping a power input operation for the RF processing apparatus or the control signal for instructing to perform the power input operation for the RF processing apparatus.

* * * * *